United States Patent
Yu et al.

(10) Patent No.: US 10,139,924 B2
(45) Date of Patent: Nov. 27, 2018

(54) INFORMATION PROCESSING METHOD AND APPARATUS BASED ON DEFORMATION CONTROLLABLE DEVICE AND USER EQUIPMENT

(71) Applicant: Beijing Zhigu Rui Tuo Tech Co., Ltd., Beijing (CN)

(72) Inventors: Kuifei Yu, Beijing (CN); Ran Xu, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 64 days.

(21) Appl. No.: 15/268,765

(22) Filed: Sep. 19, 2016

(65) Prior Publication Data

US 2017/0115746 A1    Apr. 27, 2017

(30) Foreign Application Priority Data

Oct. 23, 2015 (CN) .......................... 2015 1 0697456

(51) Int. Cl.
G09G 1/00 (2006.01)
G06F 3/03 (2006.01)
G06F 1/16 (2006.01)

(52) U.S. Cl.
CPC .............. *G06F 3/03* (2013.01); *G06F 1/1652* (2013.01)

(58) Field of Classification Search
CPC ........... G06F 1/16; G06T 11/60; H04N 5/228; G06K 9/46
See application file for complete search history.

(56) References Cited

U.S. PATENT DOCUMENTS

| | | | | |
|---|---|---|---|---|
| 2012/0113307 A1* | 5/2012 | Watanabe | .......... | H04N 5/23219 348/333.01 |
| 2015/0316961 A1* | 11/2015 | Zhang | .................. | G06F 1/1652 345/156 |

* cited by examiner

*Primary Examiner* — Michael Faragalla

(57) ABSTRACT

Embodiments of the present application disclose an information processing method and apparatus based on a deformation controllable device and a user equipment. The method comprises: acquiring at least one piece of deformation request information for a deformation controllable device performing directional interaction with an external object; and in response to that a predicted value of effects of the at least one piece of deformation request information on an interaction effect parameter of the directional interaction falls beyond an acceptable effect value range, performing a first operation to cause an actual value of effects of the at least one piece of deformation request information on the interaction effect parameter to fall within the acceptable effect value range, and/or performing a second operation of informing a user. According to implementations of the present application, effects of the deformation request information on interaction effects of the deformation controllable device are controlled within an acceptable range, or a user is informed to perform other corresponding operations, reducing a decrease in efficiency of use of the device and/or troubles brought to the user due to such deformation request information.

23 Claims, 6 Drawing Sheets

INFORMATION PROCESSING METHOD AND APPARATUS BASED ON DEFORMATION CONTROLLABLE DEVICE AND USER EQUIPMENT

TECHNICAL FIELD

The present application relates to information processing technologies, and in particular, to an information processing method and apparatus based on a deformation controllable device and a user equipment.

BACKGROUND

Flexible materials for which deformations are controllable bring new possibilities for designing of devices, and are widely expected by users. A deformation controllable device comprising such flexible materials can present different statuses of the deformation controllable device or different inputs into the deformation controllable device with different forms of the device, providing a new presentation manner to users or bringing conveniences for usage of users.

SUMMARY

A possible objective of embodiments of the present application is to provide an information processing solution based on a deformation controllable device.

In a first aspect, a possible implementation of the present application provides an information processing method based on a deformation controllable device, comprising:

acquiring at least one piece of deformation request information for a deformation controllable device performing directional interaction with an external object; and in response to that a predicted value of effects of the at least one piece of deformation request information on an interaction effect parameter of the directional interaction falls beyond an acceptable effect value range, performing a first operation to cause an actual value of effects of the at least one piece of deformation request information on the interaction effect parameter to fall within the acceptable effect value range, and/or performing a second operation of informing a user.

In a second aspect, a possible implementation of the present application provides an information processing apparatus based on a deformation controllable device, comprising:

an information acquisition module, configured to acquire at least one piece of deformation request information for a deformation controllable device performing directional interaction with an external object; and an interaction control module, configured to: in response to that a predicted value of effects of the at least one piece of deformation request information on an interaction effect parameter of the directional interaction falls beyond an acceptable effect value range, perform a first operation to cause an actual value of effects of the at least one piece of deformation request information on the interaction effect parameter to fall within the acceptable effect value range, and/or perform a second operation of informing a user.

In a third aspect, a possible implementation of the present application provides a user equipment, wherein the user equipment comprises:

a memory, configured to store a program;

a processor, configured to execute the program stored in the memory, wherein the program causes the processor to execute the following operations:

acquiring at least one piece of deformation request information for a deformation controllable device performing directional interaction with an external object; and in response to that a predicted value of effects of the at least one piece of deformation request information on an interaction effect parameter of the directional interaction falls beyond an acceptable effect value range, performing a first operation to cause an actual value of effects of the at least one piece of deformation request information on the interaction effect parameter to fall within the acceptable effect value range, and/or performing a second operation of informing a user.

In at least one implementation of the embodiments of the present application, when a deformation of a deformation controllable device corresponding to one or more pieces of deformation request information causes unacceptable effects on interaction effects of directional interaction between the deformation controllable device and an external object, at least one operation is performed to cause the effects of the deformation request information on the interaction effects of the deformation controllable device to be controlled within an acceptable range, or a user is informed to perform other corresponding operations, reducing a decrease in efficiency of use of the device and/or troubles brought to the user due to such deformation request information.

DETAILED DESCRIPTION

Figure 1:
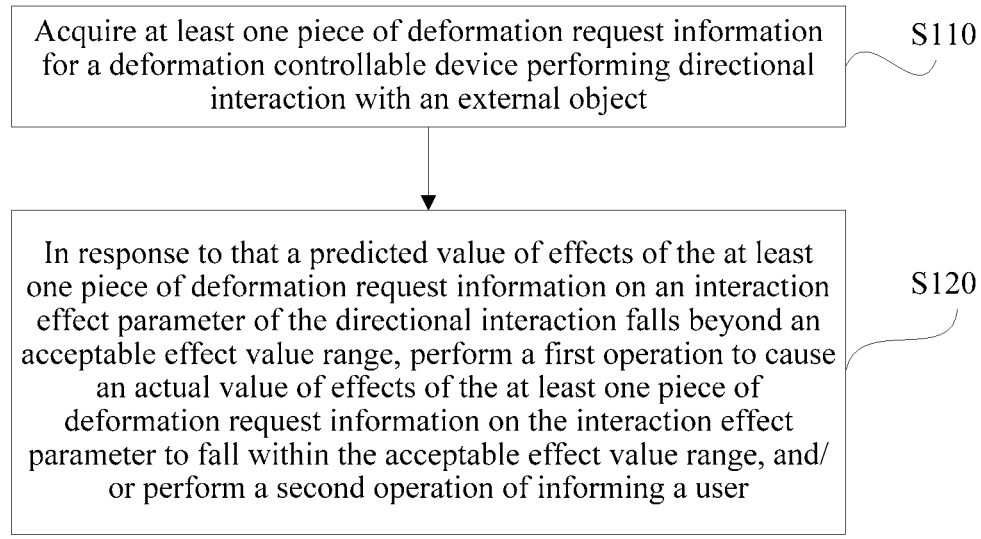
FIG. 1 is a flowchart of an information processing method based on a deformation controllable device according to an embodiment of the present application.

Specific implementations of the present application are further described in detail below with reference to the accompanying drawings (in which like elements are denoted by like reference numerals) and embodiments. The following embodiments are intended to describe the present application, but not to limit the scope of the present application.

Persons skilled in the art can understand that, terms such as "first" and "second" in the present application are merely used to differentiate different steps, devices, or modules, or the like, and neither represent any specific technical meaning nor indicate a necessary logical sequence among them.

The inventor of the present application finds that, when a deformation controllable device is in a state of directional interaction with at least one external object, form changes of the deformation controllable device may affect interaction effects of the directional interaction, bringing poor experience to a user. Therefore, as shown in FIG. 1, an embodiment of the present application provides an information processing method based on a deformation controllable device, comprising:

S110. Acquire at least one piece of deformation request information for a deformation controllable device performing directional interaction with an external object; and S120. In response to that a predicted value of effects of the at least one piece of deformation request information on an interaction effect parameter of the directional interaction falls beyond an acceptable effect value range, perform a first operation to cause an actual value of effects of the at least one piece of deformation request information on the interaction effect parameter to fall within the acceptable effect value range, and/or perform a second operation of informing a user.

In this embodiment of the present application, the deformation controllable device is a deformable device for which form changes are controllable.

In a possible implementation, the external object may comprise one or more external devices. In another possible implementation, the external object may also comprise one or more users.

For example, the information processing apparatus provided in the present application acts as an execution body of this embodiment, and performs S110 to S120. Specifically, the information processing apparatus may be disposed in a user equipment as software, hardware, or a combination of software and hardware, or the information processing apparatus is the user equipment, where the user equipment comprises but not limited to flexible devices such as a deformation controllable flexible smartphone, a flexible tablet, and a flexible hand ring.

According to the solutions in the present application, effects of deformation request information on interaction effects of a deformation controllable device can be controlled within an acceptable range, or a user is informed to perform other corresponding operations, reducing a decrease in efficiency of use of the device and/or troubles brought to the user due to such deformation request information.

Steps of this embodiment of the present application are further described by using the following implementations.

S110. Acquire at least one piece of deformation request information for a deformation controllable device performing directional interaction with an external object.

In this embodiment of the present application, the directional interaction is interaction between the deformation controllable device and the external object that is partially or entirely dependent on directionality. When a relative direction between the deformation controllable device and the external object changes, interaction effects of the directional interaction may be affected. For example, the directional interaction comprises one of the following:

wireless charging, directional wireless communication, and directional information presentation.

The directional information presentation may comprise directional displaying, directional audio playing, and the like.

Certainly, other possible directional interaction may also be applied to implementations of this embodiment of the present application.

In this embodiment of the present application, the deformation request information for the deformation controllable device is information requesting the deformation controllable device to perform a deformation corresponding to the deformation request information. In addition to information of form changes, the deformation request information may further comprise information of deformation time.

In a possible implementation, the at least one piece of deformation request information may be sent by at least one application of a software system of the deformation controllable device.

In this embodiment of the present application, the at least one piece of deformation request information may be one piece of deformation request information, or may be multiple pieces of deformation request information. The multiple pieces of deformation request information may be, for example, multiple pieces of deformation request information for the deformation controllable device in a set time, or may be all of current multiple pieces of deformation request information for the deformation controllable device.

S120. In response to that a predicted value of effects of the at least one piece of deformation request information on an interaction effect parameter of the directional interaction falls beyond an acceptable effect value range, perform a first operation to cause an actual value of effects of the at least one piece of deformation request information on the interaction effect parameter to fall within the acceptable effect value range, and/or perform a second operation of informing a user.

In this embodiment of the present application, the interaction effect parameter is a parameter related to interaction effects of the directional interaction, for example, a parameter affecting the interaction effects or a parameter measuring the interaction effects.

For example, in a scenario in which the directional interaction is wireless charging, the interaction effect parameter may be, for example, a charging efficiency;

in a scenario in which the directional interaction is directional wireless communication, the interaction effect parameter may be, for example, one or more of parameters such as a bandwidth, a rate, a received signal power, and a signal-to-noise ratio of the directional wireless communication; and in a scenario in which the directional interaction is directional information presentation, the interaction effect parameter may be, for example, a parameter such as a position offset between an optimal information presentation position and a predicted information presentation position.

In a possible implementation, optionally, the method further comprises: determining the predicted value of effects.

In a possible implementation, optionally, the determining the predicted value of effects comprises:

determining the predicted value of effects according to at least the at least one piece of deformation request information and current form information of the deformation controllable device.

For example, predicted form information of the deformation controllable device corresponding to the at least one piece of deformation request information is determined according to the at least one piece of deformation request information and the current form information, and a predicted parameter value of the interaction effect parameter is determined according to the predicted form information; a current parameter value of the interaction effect parameter is determined according to the current form information; and then the predicted value of effects is obtained according to the predicted parameter value and the current parameter value.

In a possible implementation, when the predicted value of effects is determined, in addition to the current form information of the deformation controllable device and the at least one piece of deformation request information, some parameters of the external device may further need to be considered, especially in a scenario in which position information and form information of the external device may also change. For example, in a possible implementation, when the predicted value of effects is determined, current form information of the external object may further need to be considered.

In a possible implementation, optionally, the current form information of the external object may be obtained by means of communication with the external object.

In a possible implementation, when the predicted value of effects is determined, relative position information between the external object and the deformation controllable device may further need to be considered.

Likewise, in a possible implementation, optionally, the relative position information may be obtained by means of communication with the external object.

In a possible implementation, optionally, the method may further comprise: determining the acceptable effect value range.

In a possible implementation, optionally, the determining the acceptable effect value range comprises:

determining the acceptable effect value range according to a preset range of an interaction effect parameter threshold and a current interaction effect parameter.

For example, in a possible implementation, the directional interaction is wireless charging. A preset range of an interaction effect parameter threshold is that a wireless charging efficiency should not be less than 70% of a maximum charging efficiency of the deformation controllable device. If a current wireless charging efficiency is 90% of the maximum charging efficiency, then the acceptable effect value range is not greater than 20%.

Certainly, other possible implementations may also be applied to this embodiment of the present application to determine the predicted value of effects and the acceptable effect value range. For example, in a possible implementation, determining that the predicted value of effects falls beyond the acceptable effect value range may also be: it is predicted that after a deformation corresponding to the at least one piece of deformation request information is performed, a value of the interaction effect parameter of the deformation controllable device falls beyond the preset range of an interaction effect parameter threshold.

In a possible implementation, after it is determined that the predicted value of effects falls beyond the acceptable effect value range, a deformation corresponding to the at least one piece of deformation request information may still be performed, except that a notification is sent to the user to notify the user of effects of the deformation corresponding to the at least one piece of deformation request information on the interaction effect parameter.

In a possible implementation, optionally, the first operation may comprise:

rejecting at least one deformation request corresponding to at least one of the at least one piece of deformation request information.

In this implementation, that the interaction effect parameter of the directional interaction falls beyond the preset range of an interaction effect parameter threshold is avoided by rejecting the at least one deformation request.

In a possible implementation, optionally, in addition to that the operation of rejecting the at least one deformation request is performed, an operation of informing the user may further be performed. For example, the user may be informed that one or more deformation requests are rejected. Alternatively, a reason for the rejection may further be comprised.

In a possible implementation, optionally, a reserved scheme corresponding to the rejected at least one deformation request may also be preset for implementation or for selection of the user. For example, in a possible implementation, the rejected at least one deformation request is used for requesting a set bend of the deformation controllable device to indicate a call. In this case, for example, the call indication may be replaced in an audio or visual manner (for example, by means of blinking or displaying) to notify the user of the call; or a list listing the foregoing manners as alternatives for the bending may be displayed to the user, and after information on a selected operation of the user is received, the call is indicated in a corresponding manner.

In a possible implementation, optionally, the first operation comprises:

changing at least one target deformation corresponding to at least one of the at least one piece of deformation request information.

In this implementation, when a piece of deformation request information is corresponding to a first target deformation, a predicted value of effects corresponding to the at least one piece of deformation request information falls beyond the acceptable effect value range, but when the deformation request information is corresponding to a second target deformation that can be used to implement a function corresponding to the deformation request information, the predicted value of effects may fall within the acceptable effect value range. Therefore, the predicted value of effects may be caused to fall within the acceptable effect value range by changing at least one target deformation corresponding to at least one of the at least one piece of deformation request information.

For example, in a possible implementation, a piece of deformation request information is corresponding to a deformation of a 60-degree upwarp in a corner of the deformation controllable device for notifying the user of a call. It is determined, according to a predicted value of effects corresponding to the deformation request information and the acceptable effect value range, that a deformation of a upwarp less than 48 degrees in the corner corresponding to the deformation request information can cause an actual value of effects corresponding to the deformation request information to fall within the acceptable effect value range. In this case, for example, a target deformation corresponding to the deformation request information may be modified as a 45-degree upwarp in the corner (in this embodiment, the user can learn that there is a call providing that the corner upwarps obviously).

In a possible implementation, optionally, the changing the at least one target deformation comprises:

determining the at least one target deformation according to at least at least one reserved target deformation corresponding to at least one of the at least one piece of deformation request information.

In a possible implementation, in addition to an originally corresponding original target deformation, a piece of deformation request information may further be corresponding to at least one reserved target deformation. In this embodiment, it can be determined that a reserved target deformation, in the at least one reserved target deformation, that can cause the predicted value of effects corresponding to the at least one piece of deformation request information to fall within the acceptable effect value range is a target deformation to be corresponded to the deformation request information currently.

In a possible implementation, optionally, the changing the at least one target deformation comprises:

changing the at least one target deformation according to at least a position of a directional interaction module, which is in the deformation controllable device and is configured to perform the directional interaction, in the deformation controllable device.

For example, at least one deformation for which the at least one piece of deformation request information has a minimum effect on a form or a position of the directional interaction module is determined as the at least one target deformation according to the position.

A case in which the directional interaction is wireless charging is taken as an example for description below.

In this implementation, a preset range of a charging efficiency threshold for a deformation controllable device is not less than 50%.

A piece of deformation request information for the deformation controllable device is acquired.

A predicted value of effects of the deformation request information on the charging efficiency is determined, for example, as 60%.

The predicted value of effects falls beyond the charging efficiency threshold range, and in this implementation, a deformation request corresponding to the deformation request information is rejected, and a notification is sent to the user.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

Figure 2:
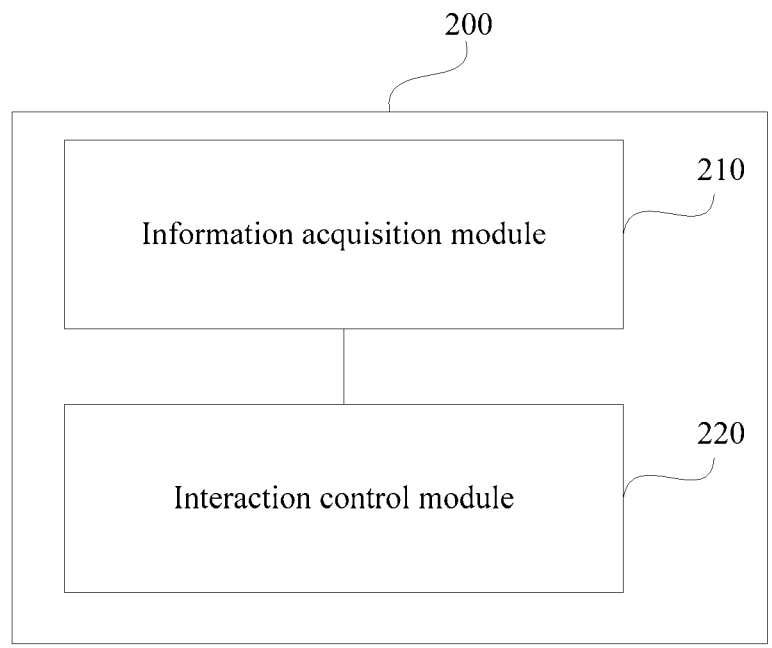
FIG. 2 is a schematic structural block diagram of an information processing apparatus based on a deformation controllable device according to an embodiment of the present application.

As shown in FIG. 2, a possible implementation of an embodiment of the present application further provides an information processing apparatus based on a deformation controllable device 200, comprising:

an information acquisition module 210, configured to acquire at least one piece of deformation request information for a deformation controllable device performing directional interaction with an external object; and an interaction control module 220, configured to: in response to that a predicted value of effects of the at least one piece of deformation request information on an interaction effect parameter of the directional interaction falls beyond an acceptable effect value range, perform a first operation to cause an actual value of effects of the at least one piece of deformation request information on the interaction effect parameter to fall within the acceptable effect value range, and/or perform a second operation of informing a user.

In this embodiment of the present application, the deformation controllable device is a deformable device for which form changes are controllable.

In a possible implementation, the external object may comprise one or more external devices. In another possible implementation, the external object may also comprise one or more users.

According to the solutions in the present application, effects of deformation request information on interaction effects of a deformation controllable device can be controlled within an acceptable range, or a user is informed to perform other corresponding operations, reducing a decrease in efficiency of use of the device and/or troubles brought to the user due to such deformation request information.

In this embodiment of the present application, the directional interaction is interaction between the deformation controllable device and the external object that is partially or entirely dependent on directionality. When a relative direction between the deformation controllable device and the external object changes, interaction effects of the directional interaction may be affected. For example, the directional interaction comprises one of the following:

wireless charging, directional wireless communication, and directional information presentation.

The directional information presentation may comprise directional displaying, directional audio playing, and the like.

Certainly, other possible directional interaction may also be applied to implementations of this embodiment of the present application.

In this embodiment of the present application, the deformation request information for the deformation controllable device is information requesting the deformation controllable device to perform a deformation corresponding to the deformation request information. In addition to information of form changes, the deformation request information may further comprise information of deformation time.

In a possible implementation, the at least one piece of deformation request information may be sent by at least one application of a software system of the deformation controllable device.

In this embodiment of the present application, the at least one piece of deformation request information may be one piece of deformation request information, or may be multiple pieces of deformation request information.

In this embodiment of the present application, the interaction effect parameter is a parameter related to interaction effects of the directional interaction, for example, a parameter affecting the interaction effects or a parameter measuring the interaction effects.

For example, in a scenario in which the directional interaction is wireless charging, the interaction effect parameter may be, for example, a charging efficiency;

in a scenario in which the directional interaction is directional wireless communication, the interaction effect parameter may be, for example, one or more of parameters such as a bandwidth, a rate, a received signal power, and a signal-to-noise ratio of the directional wireless communication; and in a scenario in which the directional interaction is directional information presentation, the interaction effect parameter may be, for example, a parameter such as a position offset between an optimal information presentation position and a predicted information presentation position.

Figure 3A:
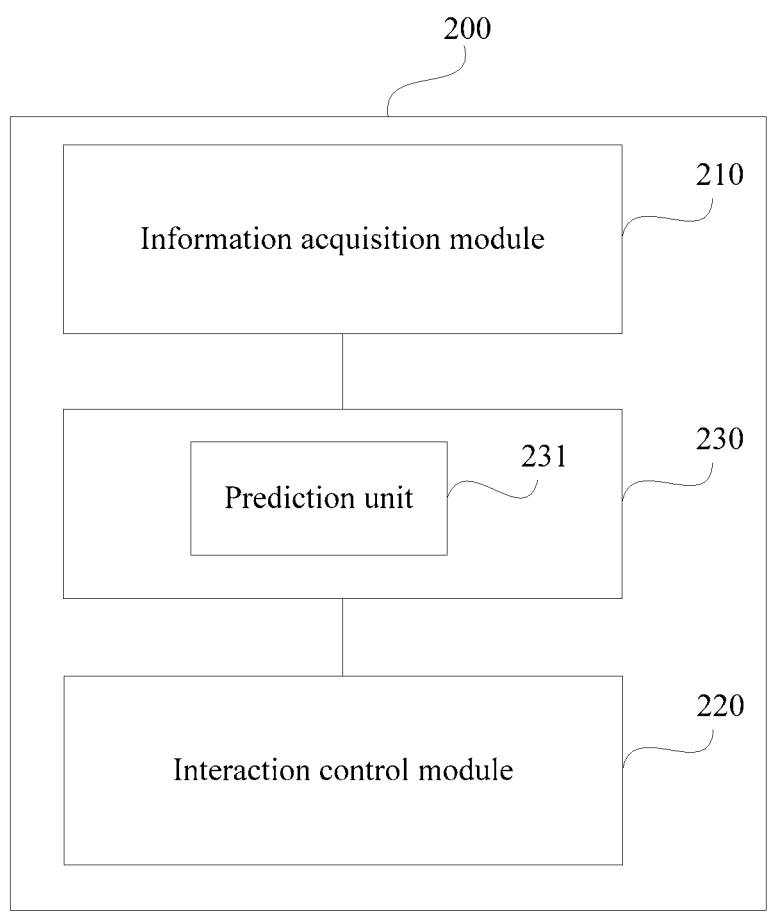
FIG. 3a to FIG. 3f are schematic structural block diagrams of six information processing apparatuses according to embodiments of the present application.

As shown in FIG. 3a, in a possible implementation, optionally, the apparatus 200 may further comprise: a prediction module 230, configured to determine the predicted value of effects.

In a possible implementation, optionally, the prediction module 230 comprises:

a prediction unit 231, configured to determine the predicted value of effects according to at least the at least one piece of deformation request information and current form information of the deformation controllable device.

For further implementation of functions of the prediction unit 231, refer to corresponding descriptions in the embodiment shown in FIG. 1.

In a possible implementation, when determining the predicted value of effects, in addition to the current form information of the deformation controllable device and the at least one piece of deformation request information, the prediction unit 231 may further need to consider some parameters of the external device, especially in a scenario in which position information and form information of the external device may also change.

For example, in a possible implementation, when determining the predicted value of effects, the prediction unit 231 may further need to consider current form information of the external object.

In a possible implementation, optionally, the current form information of the external object may be obtained by means of communication with the external object.

In a possible implementation, when determining the predicted value of effects, the prediction unit 231 may further need to consider relative position information between the external object and the deformation controllable device.

Likewise, in a possible implementation, optionally, the relative position information may be obtained by means of communication with the external object.

Figure 3B:
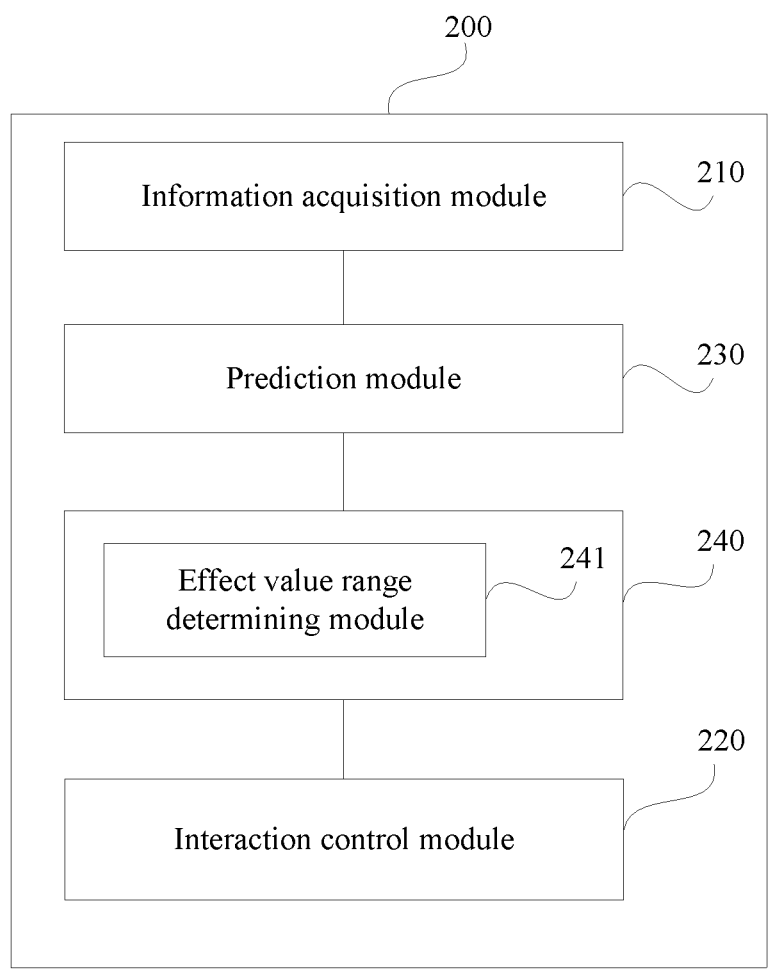

As shown in FIG. 3b, in a possible implementation, optionally, the apparatus 200 further comprises: an effect value range determining module 240, configured to determine the acceptable effect value range.

In a possible implementation, optionally, the effect value range determining module 240 comprises:

an effect value range determining unit 241, configured to determine the acceptable effect value range according to a preset range of an interaction effect parameter threshold and a current interaction effect parameter.

For further implementation of functions of the effect value range determining unit 241, refer to corresponding descriptions in the embodiment shown in FIG. 1.

Certainly, other possible implementations may also be applied to this embodiment of the present application to determine the predicted value of effects and the acceptable effect value range. For example, in a possible implementation, determining that the predicted value of effects falls beyond the acceptable effect value range may also be: it is predicted that after a deformation corresponding to the at least one piece of deformation request information is performed, a value of the interaction effect parameter of the deformation controllable device falls beyond the preset range of an interaction effect parameter threshold.

In a possible implementation, after it is determined that the predicted value of effects falls beyond the acceptable effect value range, a deformation corresponding to the at least one piece of deformation request information may still be performed, except that the interaction control module 220 performs the second operation, and sends a notification to the user to notify the user of effects of the deformation corresponding to the at least one piece of deformation request information on the interaction effect parameter.

In a possible implementation, optionally, the first operation may comprise:

rejecting at least one deformation request corresponding to at least one of the at least one piece of deformation request information.

Figure 3C:
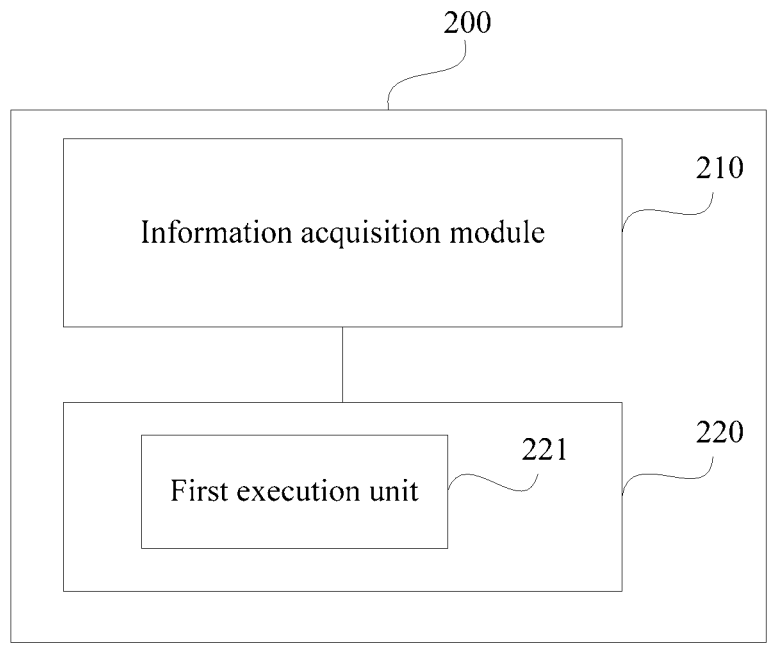

As shown in FIG. 3c, in this implementation, the interaction control module 220 comprises:

a first execution unit 221, configured to: in response to that the predicted value of effects falls beyond the acceptable effect value range, reject at least one deformation request corresponding to at least one of the at least one piece of deformation request information.

In a possible implementation, optionally, in addition to performing the operation of rejecting at least one deformation request corresponding to at least one of the at least one piece of deformation request information, the first execution unit 221 further performs an operation of informing the user. For example, the user may be informed that one or more deformation requests are rejected. Alternatively, a reason for the rejection may further be comprised.

In a possible implementation, optionally, the first operation comprises:

changing at least one target deformation corresponding to at least one of the at least one piece of deformation request information.

Figure 3D:
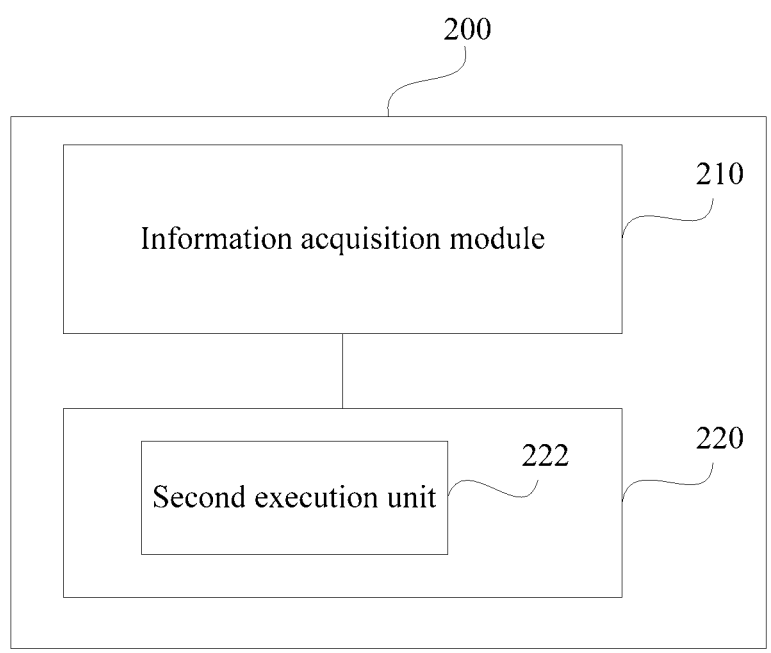
Figure 3E:
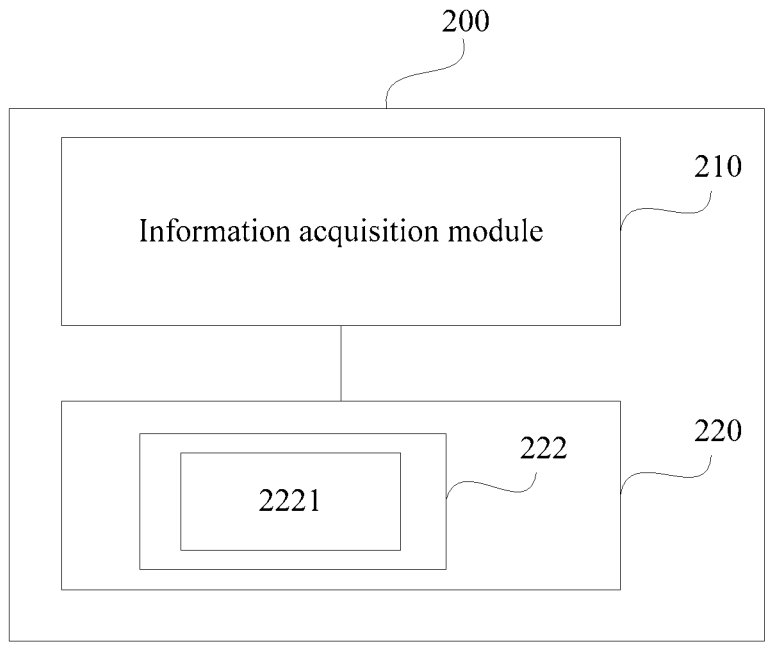
Figure 3F:
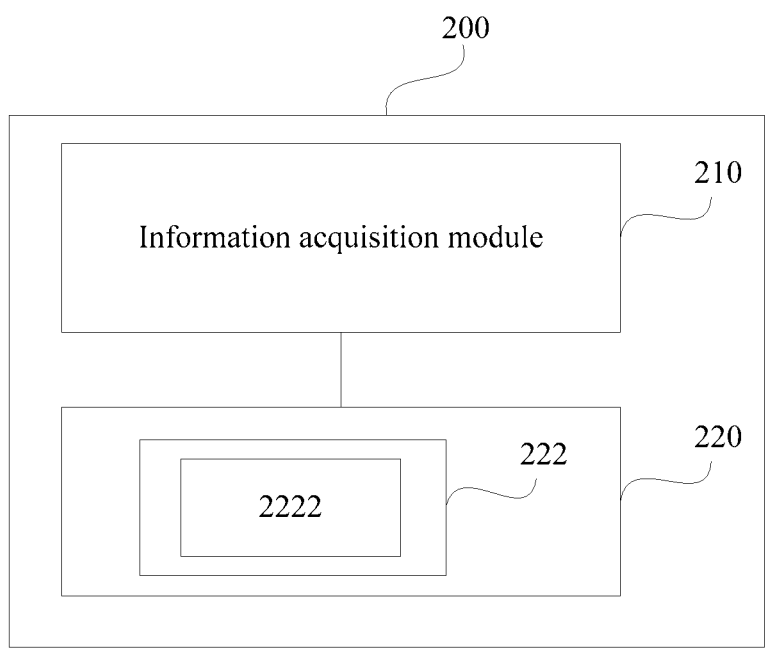

As shown in FIG. 3d, in this implementation, the interaction control module 220 comprises:

a second execution unit 222, configured to: in response to that the predicted value of effects falls beyond the acceptable effect value range, change at least one target deformation corresponding to at least one of the at least one piece of deformation request information.

In a possible implementation, optionally, the second execution unit 222 comprises:

a first target deformation determining subunit 2221, configured to determine the at least one target deformation according to at least a position of a directional interaction module, which is in the deformation controllable device and is configured to perform the directional interaction, in the deformation controllable device.

For example, at least one deformation for which the at least one piece of deformation request information has a minimum effect on a form or a position of the directional interaction module is determined as the at least one target deformation according to the position.

In a possible implementation, in addition to an originally corresponding original target deformation, a piece of deformation request information may further be corresponding to at least one reserved target deformation. In this embodiment, it can be determined that a reserved target deformation, in the at least one reserved target deformation, that can cause the predicted value of effects corresponding to the at least one piece of deformation request information to fall within the acceptable effect value range is a target deformation to be corresponded to the deformation request information currently. Therefore, in a possible implementation, optionally, the second execution unit 222 comprises:

a second target deformation determining subunit 2222, configured to determine the at least one target deformation according to at least at least one reserved target deformation corresponding to at least one of the at least one piece of deformation request information.

For further descriptions of implementation of functions of the modules and units in this embodiment of the present application, refer to corresponding descriptions in the embodiment shown in FIG. 1.

Figure 4:
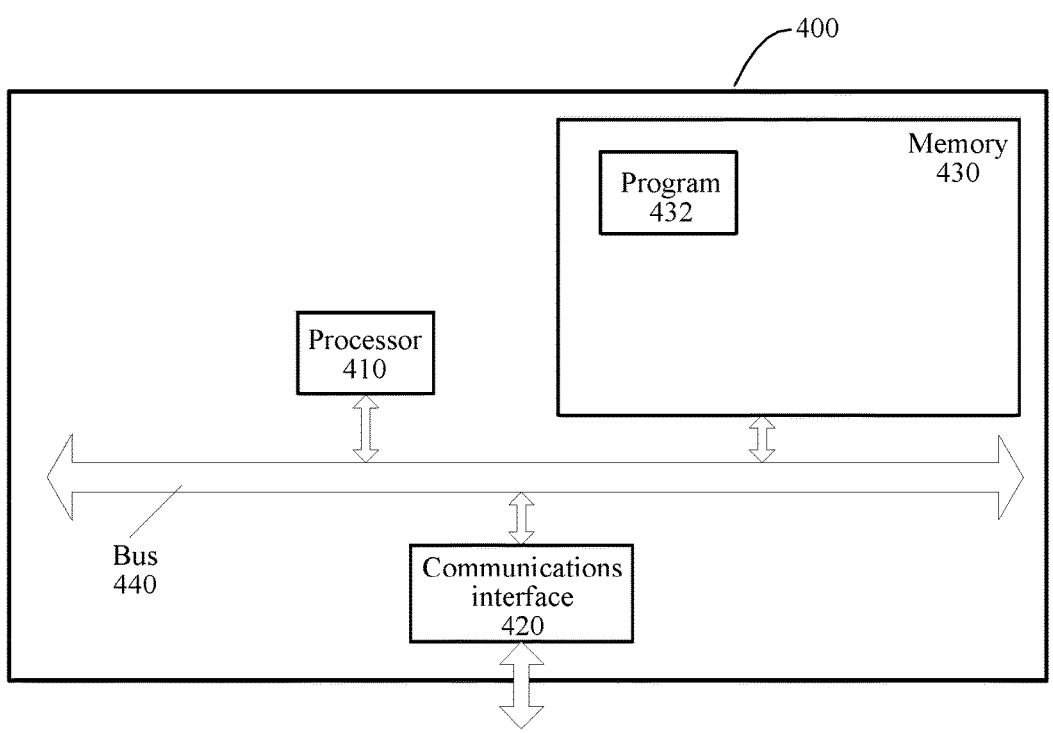
FIG. 4 is a schematic structural block diagram of a user equipment according to an embodiment of the present application.

FIG. 4 is a schematic structural diagram of another user equipment 400 provided in an embodiment of the present application. Specific embodiments of the present application do not set limitation to specific implementation of the user equipment 400. As shown in FIG. 4, the user equipment 400 may comprise:

a processor (processor) 410, a communications interface (Communications Interface) 420, a memory (memory) 430, and a communications bus 440, where the processor 410, the communications interface 420, and the memory 430 communicate with each other through the communications bus 440.

The communications interface 420 is configured for communication with a network element such as a client.

The processor 410 is configured to execute a program 432, and specifically, can perform related steps in the foregoing method embodiments.

Specifically, the program 432 may comprise program code, where the program code comprises computer operation instructions.

The processor 410 may be a central processing unit CPU, or an application-specific integrated circuit ASIC (Application Specific Integrated Circuit), or one or more integrated circuits configured to implement this embodiment of the present application.

The memory 430 is configured to store the program 432. The memory 430 may comprise a high-speed RAM memory, and may also comprise a non-volatile memory (non-volatile memory), for example, at least one magnetic disk storage. Specifically, the program 432 may be used to cause the user equipment 400 to perform the following steps:

acquiring at least one piece of deformation request information for a deformation controllable device performing directional interaction with an external object; and in response to that a predicted value of effects of the at least one piece of deformation request information on an interaction effect parameter of the directional interaction falls beyond an acceptable effect value range, performing a first operation to cause an actual value of effects of the at least one piece of deformation request information on the interaction effect parameter to fall within the acceptable effect value range, and/or performing a second operation of informing a user.

In a possible implementation, the user equipment is the deformation controllable device.

For the specific implementation of the steps in the program 432, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

A person of ordinary skill in the art may be aware that, exemplary units and method steps described in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. An information processing method based on a deformation controllable device, comprising:

acquiring at least one piece of deformation request information for a deformation controllable device performing directional interaction with an external object, wherein the at least one piece of deformation request information requests a deformation of the deformation controllable device; and in response to that a predicted value of effects of the deformation of the deformation controllable device corresponding to the at least one piece of deformation request information on an interaction effect parameter of the directional interaction falls beyond an acceptable effect value range, performing a first operation to cause an actual value of effects of the deformation of the deformation controllable device corresponding to the at least one piece of deformation request information on the interaction effect parameter to fall within the acceptable effect value range, and/or performing a second operation of informing a user.

2. The method of claim 1, wherein the first operation comprises:

rejecting at least one deformation request corresponding to at least one of the at least one piece of deformation request information.

3. The method of claim 1, wherein the first operation comprises:

changing at least one target deformation corresponding to at least one of the at least one piece of deformation request information.

4. The method of claim 3, wherein the changing at least one target deformation comprises:

changing the at least one target deformation according to at least a position of a directional interaction module, which is in the deformation controllable device and is configured to perform the directional interaction, in the deformation controllable device.

5. The method of claim 3, wherein the changing at least one target deformation comprises:

determining the at least one target deformation according to at least at least one reserved target deformation corresponding to at least one of the at least one piece of deformation request information.

6. The method of claim 1, wherein the method further comprises: determining the predicted value of effects.

7. The method of claim 6, wherein the determining the predicted value of effects comprises:

determining the predicted value of effects according to at least the at least one piece of deformation request information and current form information of the deformation controllable device.

8. The method of claim 7, wherein the determining the predicted value of effects comprises:
further determining the predicted value of effects according to current form information of the external object and/or relative position information between the external object and the deformation controllable device.

9. The method of claim 1, wherein the method further comprises: determining the acceptable effect value range.

10. The method of claim 9, wherein the determining the acceptable effect value range comprises:
determining the acceptable effect value range according to a preset range of an interaction effect parameter threshold and a current interaction effect parameter.

11. The method of claim 1, wherein the directional interaction comprises at least one of the following:
wireless charging, directional wireless communication, and directional information presentation.

12. An information processing apparatus based on a deformation controllable device, comprising:
an information acquisition module, configured to acquire at least one piece of deformation request information for a deformation controllable device performing directional interaction with an external object, wherein the at least one piece of deformation request information requests a deformation of the deformation controllable device; and
an interaction control module, configured to: in response to that a predicted value of effects of the deformation of the deformation controllable device corresponding to the at least one piece of deformation request information on an interaction effect parameter of the directional interaction falls beyond an acceptable effect value range, perform a first operation to cause an actual value of effects of the deformation of the deformation controllable device corresponding to the at least one piece of deformation request information on the interaction effect parameter to fall within the acceptable effect value range, and/or perform a second operation of informing a user.

13. The apparatus of claim 12, wherein the first operation comprises:
rejecting at least one deformation request corresponding to at least one of the at least one piece of deformation request information; and
the interaction control module comprises:
a first execution unit, configured to: in response to that the predicted value of effects falls beyond the acceptable effect value range, reject the at least one deformation request.

14. The apparatus of claim 12, wherein the first operation comprises:
changing at least one target deformation corresponding to at least one of the at least one piece of deformation request information; and
the interaction control module comprises:
a second execution unit, configured to: in response to that the predicted value of effects falls beyond the acceptable effect value range, change at least one target deformation corresponding to at least one of the at least one piece of deformation request information.

15. The apparatus of claim 14, wherein the second execution unit comprises:
a first target deformation determining subunit, configured to determine the at least one target deformation according to at least a position of a directional interaction module, which is in the deformation controllable device and is configured to perform the directional interaction, in the deformation controllable device.

16. The apparatus of claim 14, wherein the second execution unit comprises:
a second target deformation determining subunit, configured to determine the at least one target deformation according to at least at least one reserved target deformation corresponding to at least one of the at least one piece of deformation request information.

17. The apparatus of claim 12, wherein the apparatus further comprises: a prediction module, configured to determine the predicted value of effects.

18. The apparatus of claim 17, wherein the prediction module comprises:
a prediction unit, configured to determine the predicted value of effects according to at least the at least one piece of deformation request information and current form information of the deformation controllable device.

19. The apparatus of claim 18, wherein the prediction module is further configured to determine the predicted value of effects according to at least the at least one piece of deformation request information and current form information of the deformation controllable device, and according to current form information of the external object and/or relative position information between the external object and the deformation controllable device.

20. The apparatus of claim 12, wherein the apparatus further comprises: an effect value range determining module, configured to determine the acceptable effect value range.

21. The apparatus of claim 20, wherein the effect value range determining module comprises:
an effect value range determining unit, configured to determine the acceptable effect value range according to a preset range of an interaction effect parameter threshold and a current interaction effect parameter.

22. The apparatus of claim 12, wherein the directional interaction comprises at least one of the following:
wireless charging, directional wireless communication, and directional information presentation.

23. A user equipment, wherein the user equipment comprises:
a memory, configured to store a program;
a processor, configured to execute the program stored in the memory, wherein the program causes the processor to execute the following operations:
acquiring at least one piece of deformation request information for a deformation controllable device performing directional interaction with an external object, wherein the at least one piece of deformation request information requests a deformation of the deformation controllable device; and
in response to that a predicted value of effects of the deformation of the deformation controllable device corresponding to the at least one piece of deformation request information on an interaction effect parameter of the directional interaction falls beyond an acceptable effect value range, performing a first operation to cause an actual value of effects of the deformation of the deformation controllable device corresponding to the at least one piece of deformation request information on the interaction effect parameter to fall within the acceptable effect value range, and/or performing a second operation of informing a user.

* * * * *